United States Patent
Bijl et al.

(10) Patent No.: US 9,629,314 B2
(45) Date of Patent: Apr. 25, 2017

(54) HOLDER FOR PLANTS AND A PLANT CULTIVATION METHOD

(71) Applicant: Vivi B.V., 's-Gravendeel (NL)

(72) Inventors: Jacob Johannes Bijl, Burgh-Haamstede (NL); Cornelis Frans Taco Visser, 's-Gravendeel (NL)

(73) Assignee: Vivi B.V., 'S-Gravendeel (NL)

( * ) Notice: Subject to any disclaimer, the term of this patent is extended or adjusted under 35 U.S.C. 154(b) by 87 days.

(21) Appl. No.: 14/512,494

(22) Filed: Oct. 13, 2014

(65) Prior Publication Data

US 2015/0027049 A1    Jan. 29, 2015

Related U.S. Application Data

(63) Continuation of application No. PCT/NL2013/050259, filed on Apr. 9, 2013.

(30) Foreign Application Priority Data

Apr. 13, 2012  (NL) ..................... 2008637

(51) Int. Cl.
*A01G 27/00*  (2006.01)
*A01G 9/10*  (2006.01)
(Continued)

(52) U.S. Cl.
CPC ........... *A01G 27/005* (2013.01); *A01G 1/001* (2013.01); *A01G 9/10* (2013.01); *A01G 9/108* (2013.01);
(Continued)

(58) Field of Classification Search
CPC .... A01G 27/00; A01G 27/005; A01G 9/1026; A01G 9/1033; A01H 4/001; Y02P 60/216
(Continued)

(56) References Cited

U.S. PATENT DOCUMENTS

| 1,264,096 A | 4/1918 | Lievre |
| 4,027,427 A | 6/1977 | Stoller et al. |

(Continued)

FOREIGN PATENT DOCUMENTS

| DE | 102009007415 A1 | 8/2010 |
| EP | 0287284 | 10/1988 |

(Continued)

OTHER PUBLICATIONS

International Search report of PCT/NL2013/050259 issued on Jul. 18, 2013.
(Continued)

*Primary Examiner* — Joshua Huson
(74) *Attorney, Agent, or Firm* — Ramin Amirsehhi; David P. Owen; Hoyng Rokh Monegier LLP (57) ABSTRACT

A holder for producing a plant of any one of lettuce, sprout and herbs, having a container and a semi-permeable filter, for defining a closed space for wholly accommodating the plant; a reservoir for holding an amount of liquid in the close space; and a passage which is open during use for supplying the liquid to the plant, wherein the reservoir, the container and the semi-permeable filter are arranged to allow the whole plant to grow in the closed space, wherein the semi-permeable filter has a vapor permeation capacity related to a type of the plant and the content of the reservoir, and wherein the amount of liquid is pre-determined corresponding to the vapor permeation capacity, such that the amount of liquid is sufficient for the plant to be isolated in the closed space from cultivation through to offering for sale.

7 Claims, 5 Drawing Sheets

(51) Int. Cl.
*A01G 31/02* (2006.01)
*A01G 1/00* (2006.01)
*A01G 27/02* (2006.01)
*A01G 27/06* (2006.01)

(52) U.S. Cl.
CPC ............ *A01G 27/02* (2013.01); *A01G 27/06* (2013.01); *A01G 31/02* (2013.01); *Y02P 60/216* (2015.11)

(58) Field of Classification Search
USPC .......................................................... 47/66.7
See application file for complete search history.

(56) References Cited

U.S. PATENT DOCUMENTS

| | | | |
|---|---|---|---|
| 4,117,632 A | 10/1978 | Pearce | |
| 4,299,054 A | 11/1981 | Ware | |
| 4,324,070 A | 4/1982 | Swisher | |
| 4,369,598 A * | 1/1983 | Beckwith | A01G 31/06 220/4.27 |
| 4,434,577 A * | 3/1984 | Holtkamp | A01G 27/04 47/67 |
| 4,531,324 A * | 7/1985 | Yang | A01H 4/001 47/59 R |
| 4,903,432 A | 2/1990 | Velagaleti et al. | |
| 4,908,315 A * | 3/1990 | Kertz | A01C 1/042 435/292.1 |
| 4,932,159 A | 6/1990 | Holtkamp, Sr. | |
| 5,171,683 A * | 12/1992 | Kertz | A01G 31/04 435/297.1 |
| 5,860,249 A | 1/1999 | Holtkamp, Jr. | |
| 6,079,156 A | 6/2000 | Colovic | |
| 2005/0011123 A1 | 1/2005 | Dai | |
| 2005/0172548 A1 | 8/2005 | Bement | |
| 2007/0292950 A1* | 12/2007 | Bijl | A01G 9/1033 435/420 |
| 2009/0064576 A1 | 3/2009 | Sugarek | |
| 2011/0036006 A1 | 2/2011 | Griebel | |
| 2012/0017505 A1* | 1/2012 | Bijl | A01G 9/1033 47/66.7 |

FOREIGN PATENT DOCUMENTS

| | | |
|---|---|---|
| FR | 2724812 | 3/1996 |
| JP | AS39021621 A | 10/1964 |
| JP | JUS53023756 A | 6/1980 |
| JP | AH01502421 A | 9/1987 |
| JP | JUH0155399 A | 10/1989 |
| JP | JUS63048450 A | 10/1989 |
| JP | 2009072075 A | 9/2007 |
| JP | A201029115 A | 7/2008 |
| JP | 2011217614 A | 4/2010 |
| NL | 97090 C | 2/2009 |
| WO | 2005063000 A2 | 7/2005 |
| WO | 2005120212 | 12/2005 |
| WO | 2010082814 | 7/2010 |
| WO | 2013124794 A1 | 8/2013 |

OTHER PUBLICATIONS

Innervisions 1996. Printed from a website on May 31, 2016.
International search report PCT/EP2014/072164 issued on Jan. 29, 2015.
International search report PCT/NL2014/050259 issued on Jul. 10, 2013.

* cited by examiner

HOLDER FOR PLANTS AND A PLANT CULTIVATION METHOD

CROSS-REFERENCE TO RELATED APPLICATIONS

This application is a continuation of PCT application number PCT/NL2013/050259 filed on Apr. 9, 2013, which claims priority from the Netherlands application number NL2008637 filed on 13 Apr. 2012. Both applications are hereby incorporated by reference in their entireties.

BACKGROUND OF THE INVENTION

The present invention relates to a holder for at least one plant, such as lettuce, and a method for at least two of growing, transporting and offering for sale of the plants in the container.

The conventional practice in the technical field of plant growth, cultivation and merchandising is that plants have to be replanted. Seeds and seedlings are sown/planted in cups in a tray or small plant pots and, after they have developed sufficiently, transplanted into larger holders and so on, until the plants, having reached a stage of development suitable for the market, for instance the consumer market or other sales channels, are sold in holders sufficiently large for the purpose. It is assumed here that potential problems are resolved at least in terms of growth and space requirements, which should be kept to a minimum in relation to the stage of development of a plant in order to minimize use of space and costs associated therewith. This approach does however stand in the way of maximum growth and/or development of plants and extends the period of growth or cultivation. It is precisely because of this minimalist approach that plants are inhibited in their development.

Replanting of plants during their development is also disadvantageous in the sense that pathogens may spread to the plants during the replanting, which entails a risk of death. Nutrients and water are usually also administered for multiple plants at a time, this increasing still further the risk of pathogens being transmitted.

It is acknowledged here that U.S. Pat. No. 4,903,432 discloses a plant pot in combination with a refillable reservoir for water and nutrients.

SUMMARY OF THE INVENTION

The present invention provides growers and producers with an entirely new approach, wherein it is possible to isolate plants from each other and from pathogens and keep them separated during a number of stages (at least two) from sowing through to (offering for) sale, for instance in a retail shop, garden centre and so on.

The holder according to the invention comprises for this purpose all the features as according to the appended claim 1, and the method according to the present invention comprises for this purpose all the steps as according to the appended claim 9.

In an embodiment, the present invention provides a holder for at least one plant such as lettuce, sprouts and herbs, comprising:
a container for accommodating the plant with an entrance to the interior thereof;
a reservoir having therein during use a predetermined amount of liquid and a passage which is open during use (and is preferably closed before use) and which is connected to the interior of the container at a distance from the entrance; and
a semi-permeable filter on or over the entrance, characterized in that
the semi-permeable filter has a vapour permeation capacity related to a type of the plant and the content of the reservoir,
the container and the filter are formed and dimensioned to wholly accommodate and separate the plant from the surrounding area in diverse, and preferably all stages of growth, and
the reservoir is dimensioned to contain an amount of water in the reservoir, this amount being sufficient to feed the plant during the diverse stages of growth thereof,
the vapour permeation capacity of the semi-permeable filter and the amount of liquid in the reservoir are made to correspond, wherein the plant can be left in the container from cultivation through to being offered for sale.

In an embodiment, the invention provides a method for at least two of growing, transporting and offering for sale of a plant in a container, comprising of:
providing a container for accommodating the plant with an entrance to the interior thereof;
providing a reservoir and arranging a predetermined amount of liquid therein;
providing a passage which is open during use (and is preferably closed before use) and which is connected to the interior of the container at a distance from the entrance; and
arranging a semi-permeable filter on or over the entrance, characterized by
holding a semi-permeable filter arranged on or over the entrance during the at least two of growing, transporting and offering for sale of the plant, the semi-permeable filter having a vapour permeation capacity related to a type of the plant and the content of the reservoir,
wholly accommodating the plant in a space defined by the container and the filter during diverse and preferably all stages of growth, and thus separating the plant from the surrounding area, and
arranging an amount of water and optional nutrients in the reservoir, this amount being sufficient to feed the plant during the diverse stages of growth thereof,
making a vapour permeation capacity of the semi-permeable filter and the amount of liquid in the reservoir correspond, and leaving the plant in the container from cultivation through to offering for sale.

With a holder and a method according to the present invention it is possible to progress through at least two of raising, growth, transport and merchandising of the plants, each in a single holder, with negligible risk of introduction or transmission of pathogens or allowing any other harmful influence on the plants.

The semi-permeable filter can be a semi-permeable material, a film or a filter forming a barrier to excessive outflow of moist air so as to bring and keep at least the rate of permeation in line with a moisture requirement of the plants and the predetermined amount of water or other moisture in the reservoir. Pathogens are excluded, while oxygen, carbon dioxide and other substances and/or gases required for the growth and development of the plants can be allowed through.

In a preferred embodiment a holder according to the invention further has the feature that the container and the reservoir form a unit. Protection of the plant in each holder can thus be optimized and a robust design can result here.

In a preferred embodiment a holder according to the invention further has the feature that a liquid barrier is arranged between the container and the reservoir to prevent flow of liquid out of the liquid reservoir into the container. In this way—despite movements, for instance during transport—the amount of water in the reservoir is and remains available for absorption by the plant.

In a preferred embodiment a holder according to the invention further has the feature that a substrate holder for accommodating roots of the plants is arranged between the container and the reservoir. A root system of the plant can thus grow in at least a substrate in the substrate holder, and even therethrough so as to extend immediately or after a time of development into the water or other liquid in the reservoir and to then draw water directly from the reservoir.

In a preferred embodiment a holder according to the invention further has the feature that there is arranged in the passage at least one element from the group comprising: a rope, a string, a wick, a lamella, which has a moisture-transmitting capacity, for instance on the basis of a capillary action, from the reservoir to the plants. It is thus possible—particularly during the cultivation of plants with a young and thus short root system—to ensure that sufficient moisture, water or other liquid from the reservoir reaches (the roots of) the plant in the container so as to enhance the development of the plant.

In a preferred embodiment a holder according to the invention further has the feature that the vapour permeation capacity of the semi-permeable filter and the amount of liquid in the reservoir can be made to correspond such that the plants can be left in the container from early cultivation through to being offered for sale (e.g. growing the plant in an isolated/closed off status without feeding liquid from outside the closed space). The plant can thus remain in the holder during the whole cycle from seed to shop/garden centre, and all harmful outside influences can be eliminated or at least excluded, so that the plant can develop in predictable and reproducible manner and the consumer can be presented with a reliable quality. This will of course also be the case if fewer than all stages of the cultivation to sale cycle are completed with the plant in the holder.

In a preferred embodiment a holder according to the invention further has the feature that the semi-permeable filter is closed to elements entering from outside, such as pathogens. The filter will thus allow passage of vapour in order to hold the air humidity in the holder at a desired value but the filter will further exclude all potentially harmful influences. A microculture is thus provided, with protection of the plant in the holder against outside influences and at least approximately ideal growth and development conditions in the holder.

In a preferred embodiment a holder according to the invention further has the feature that at least one second container is arranged on, at or near the reservoir. A combined embodiment can thus be provided, with a plurality of containers and a single reservoir. This can then take the form of a double bottom of a tray, case or crate, where containers can be coupled or otherwise arranged on or at a partition wall of this reservoir.

In a preferred embodiment a holder according to the invention further has the feature of a cover or closing film on or over the semi-permeable filter. A cover serves for instance during transport to completely close the holder and hold moisture or vapour in the container. For this purpose use can also or likewise be made of a closing film which can be arranged over the semi-permeable filter. Such a film can be self-adhesive and comprise for this purpose an adhesive layer, or be tensioned completely separately over the semi-permeable filter and arranged on the container.

In an embodiment, the semi-permeable filter comprises perforations smaller than 100 μm, uniformly distributed on the semi-permeable filter, and arranged to control a degree of isolation and permeation.

In an embodiment, the reservoir forms a box for accommodating a plurality of containers and corresponding semi-permeable filters. The box preferably comprises a bottom, comprising a plurality of disk-like recesses for holding the liquid, wherein each recess is configured to couple to a container for defining the closed space, such that plants are isolated from each other.

In an embodiment, the plant is grown in the closed space without supplying liquid from outside the closed space.

It should be noted that diverse of the above stated and individually presented preferred embodiments can be combined, as will also be apparent from the dependencies of the dependent claims.

BRIEF DESCRIPTION OF THE DRAWINGS

The present invention will be further illustrated hereinbelow on the basis of an exemplary embodiment, in which diverse individual preferred embodiments are described in combination, as shown in the accompanying drawings, to which the present invention is not per se limited since the invention is limited only by the limitations in the definition according to the independent claim of the appended claims. In the drawing:

The figures are meant for illustrative purposes only, and do not serve as restriction of the scope or the protection as laid down by the claims.

DETAILED DESCRIPTION OF THE INVENTION

The following is a description of certain embodiments of the invention, given by way of example only and with reference to the drawings.

Figure 1:
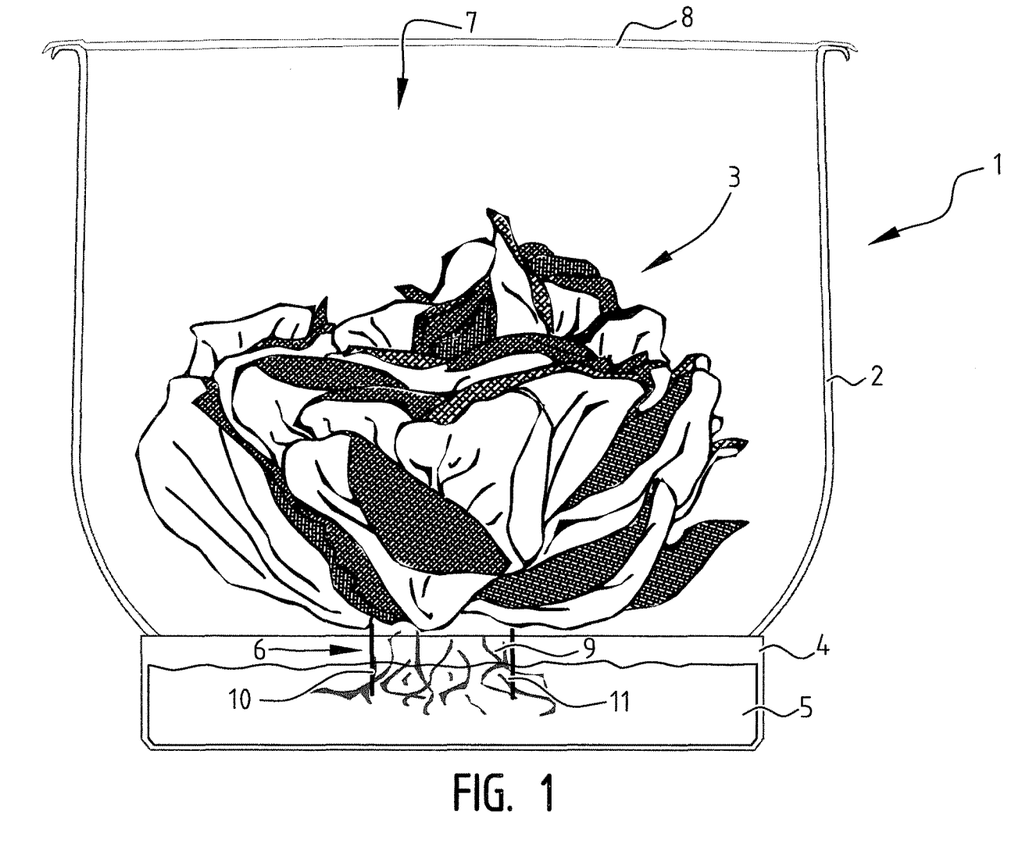
FIG. 1 shows a holder according to the present invention in a first embodiment.

FIG. 1 shows a holder 1 in a first embodiment according to the present invention. Holder 1 comprises a container 2 for wholly accommodating at least one plant, such as lettuce, so including the roots and twigs, stems, foliage and so on growing above the substrate, during at least various stages of growth or cultivation and preferably from planting through to sale in a shop. It is noted that lettuce seed can be raised in another holder before young lettuce plants can be placed in the container according to the present invention. Lettuce seed can for instance be raised in a holder as known from the earlier international patent application WO-2005/120212 of the inventor and, following an initial cultivation period of a number of other lettuce plants in the thus known holder, individual young lettuce plants are transferred to holders according to the present invention and then progress through diverse stages of growth. Container 2 is arranged on a reservoir 4 with water 5 therein. The water can comprise additives such as nutrients for lettuce 3. Provided between container 2 and reservoir 4 is a passage 6, and container 2 comprises an entrance 7 opposite passage 6. Entrance 7 is covered with a semi-permeable filter in the form of a film 8 which can allow passage of water vapour from the interior of container 2 but keeps out pathogens and other harmful influences.

The amount of water 5 in reservoir 4 is made to correspond with the vapour permeation capacity of filter 8 and the moisture requirement of lettuce 3 in container 2. It is thus possible to ensure that lettuce 3 can remain closed off from the area outside holder 1 during a desired number of growth or development stages, preferably from the planting of individual young lettuce plants (coming for instance from a shared container, as known from WO-2005/120212, hereby incorporated by reference in its entirety, in which lettuce seed is cultivated into a plurality of lettuce plants together) through to being offered for sale in a shop. Holder 1 can particularly, though not exclusively, accommodate the lettuce from the moment that seeds are placed in the passage and filter 8 is placed over entrance 7 in order to close holder 1. The amount of water 5 in reservoir 4 is sufficient to feed lettuce 3 during its whole development to full growth, and the vapour permeation capacity of filter 8 ensures that enough of the water vapour secreted by lettuce 3 can be discharged from container 2. The semi-permeable filter is preferably also semi-permeable in respect of passage and/or exchange of gases such as oxygen ($O_2$), carbon dioxide ($CO_2$), ethylene and the like. Such gases can preferably also penetrate into the container from outside through filter 8. A system can thus be provided in which the lettuce 3 can be wholly accommodated in holder 1, and protected from harmful influences such as pathogens from outside, from the very beginning through to full growth when the lettuce 3 is suitable to be offered for sale in for instance a shop.

A substrate 9 can also be arranged in passage 6. This also forms a liquid barrier for preventing a part of the water 5 flowing out of reservoir 4 into container 2 in the case holder 1 unintentionally takes up an inclining position. If on the other hand a barrier such as substrate or the like is absent, water 5 will still simply flow back into the reservoir when an unintentional inclining position has been corrected or eliminated. Arranged in passage 6 is a short cylindrical or tubular tube 10. Tube 10 in fact forms passage 6. This can contain substrate 9. In this respect tube 10 is also a substrate holder in the sense of the present embodiment of the present invention. Roots growing in the substrate in the substrate holder or tube 10 will also extend into reservoir 4, and more precisely also into water 5 in reservoir 4. The development of lettuce 3 will accelerate as soon as the roots 11 of the lettuce 3 extend into water 5 in the reservoir.

It is noted that substrate 9 can extend over a whole upper surface of reservoir 4. More than one passage 6 can be provided for passage of water from reservoir 4 to roots of the plants and of vapour to the leaves of the plants. Such an embodiment is highly suitable (though not exclusively) for use in combination with seeds which can be placed on the mat of substrate 9, such as sprouts and herbs.

In the embodiment of FIG. 1 the earliest development of the roots 11 of lettuce 3 depends on evaporation of water 5 from reservoir 4. The vapour is drawn into substrate 6 and feeds the roots. The roots later extend directly into the water in the reservoir.

Figure 2:
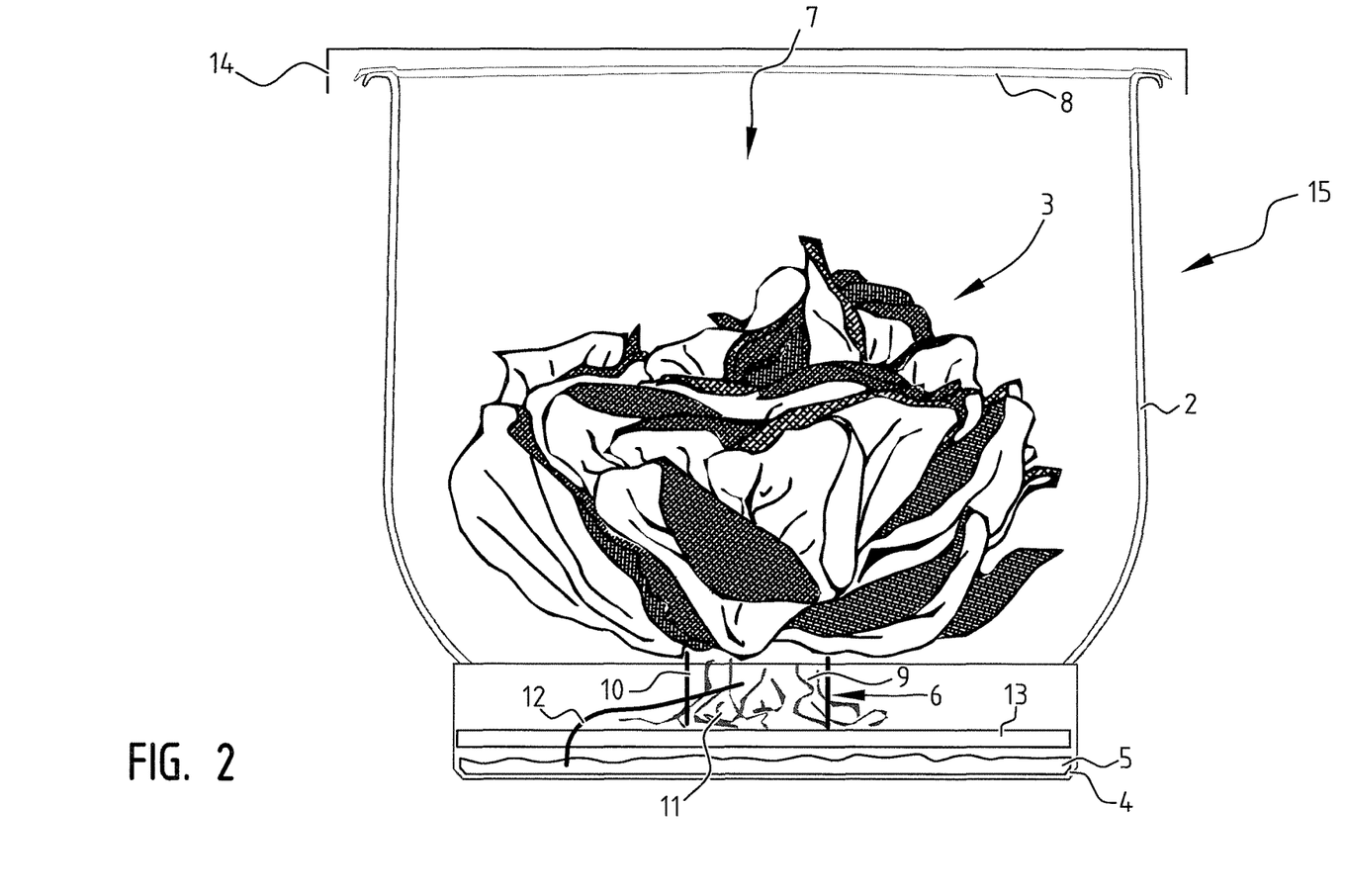
FIG. 2 shows a holder according to the present invention in a second embodiment.

Added in the embodiment of FIG. 2 is a wick 12 which extends from the tube 10 forming a substrate holder in passage 6 to the water 5 in reservoir 4. Wick 12 draws water from reservoir 4 in order also to better provide the roots with water at an early stage of development than on the basis of evaporation alone.

Arranged above water 5 in reservoir 4 is an optional separator 13. Separator 13 likewise forms a barrier against passage of water 5 from reservoir 4 to the interior of container 2. The roots 11 of lettuce 3 are enclosed above separator 13 at a distance from the water 5 in reservoir 4. Supply of water takes places wholly via wick 12 but, since separator 13 is an option, in the absence of separator 13 wick 12 can also be utilized, mainly in the early stages of development of lettuce 3, to increase the supply of water 5 from reservoir 4 to substrate 9 in tube 10 in passage 6, in any case until the roots 11 of lettuce 3 have developed sufficiently and extend into the water 5 of reservoir 4 in order to draw water 5 from reservoir 4 themselves.

A cover 14 is further provided in the embodiment of FIG. 2. Cover 14 can be arranged over or on filter 8, for instance to close it temporarily, for instance during transport of holder 1 or 15 in FIG. 2. As alternative to a cover a closing film can be used which can optionally be self-adhering with for instance an adhesive layer, or can be stretched loosely over the arranged film and attached to or arranged on the outer side on the container.

Figure 3:
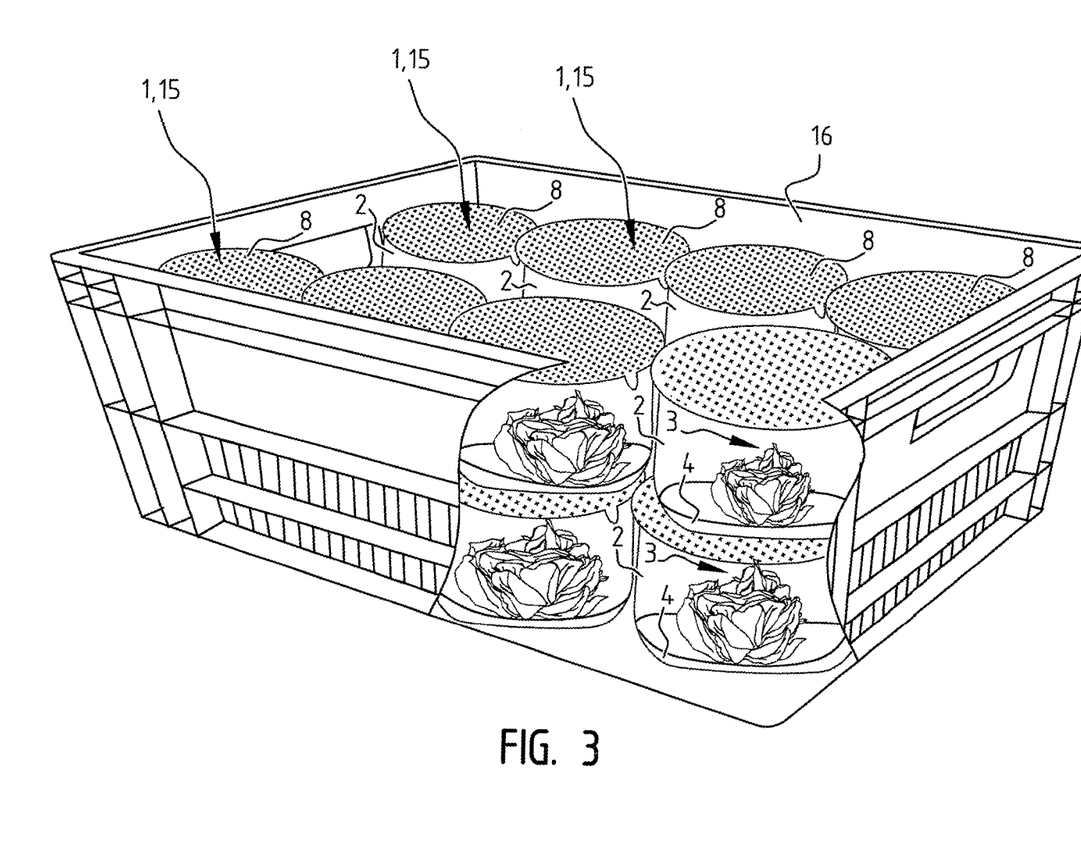
FIG. 3 shows a case or crate having therein a number of holders according to the present invention in a random embodiment.

Shown in FIG. 3 is that a plurality of holders 1 can be placed and stacked together in a case 16 or crate, for instance for transport purposes. Covers 14 are absent in the embodiment shown in FIG. 3.

Because holders 1, 15 can take the form of the embodiment of FIG. 1 or of FIG. 2, both reference numerals are shown in FIG. 3.

It is noted that the same or similar parts, components and elements of a holder 1, 15 according to the present invention can be designated with the same or similar reference numerals.

Figure 4:
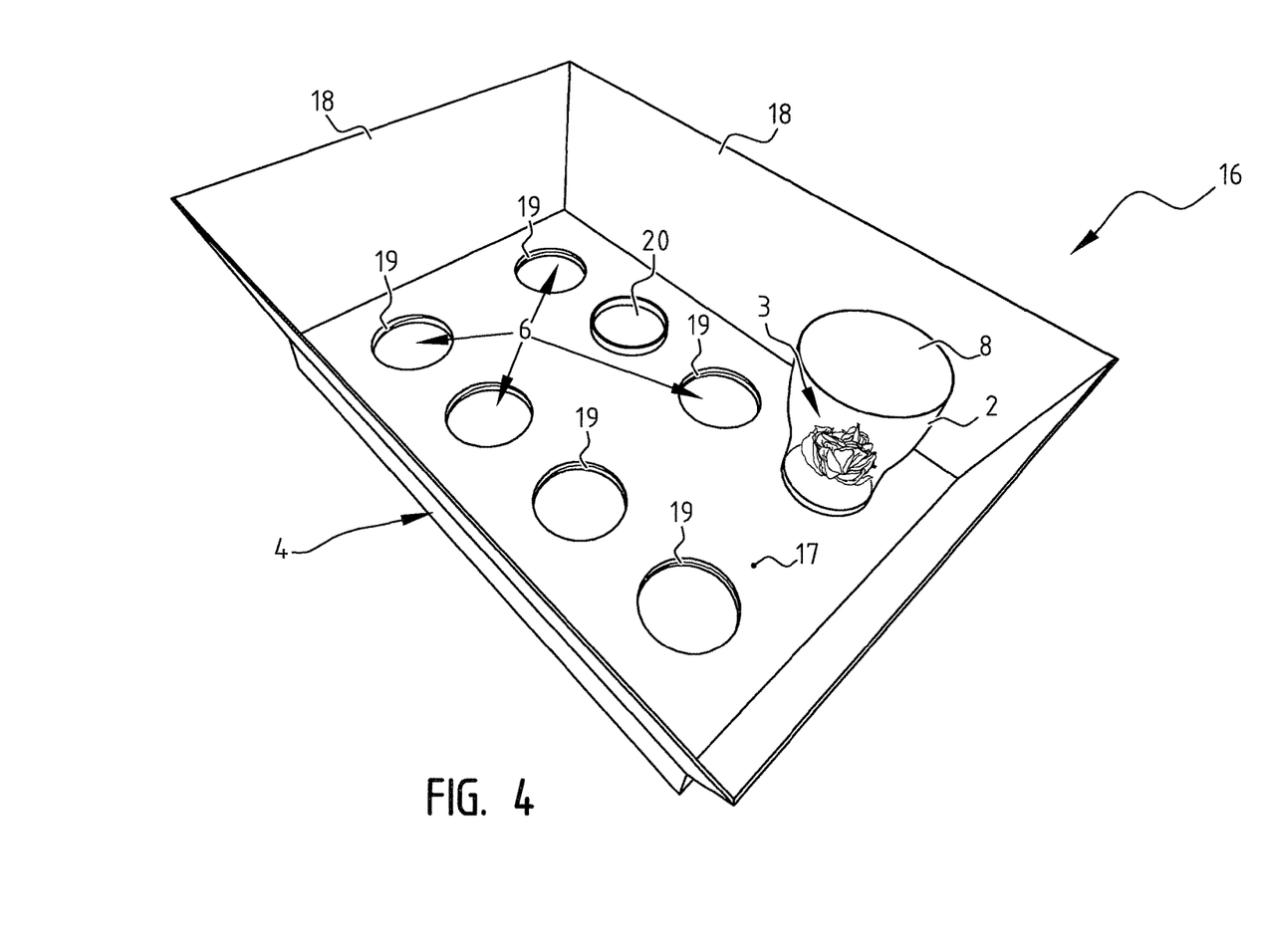
FIG. 4 shows another embodiment of a case, crate or other embodiment with at least two containers for accommodating plants so as to form in combination a holder according to the present invention in a further embodiment.
Figure 5:
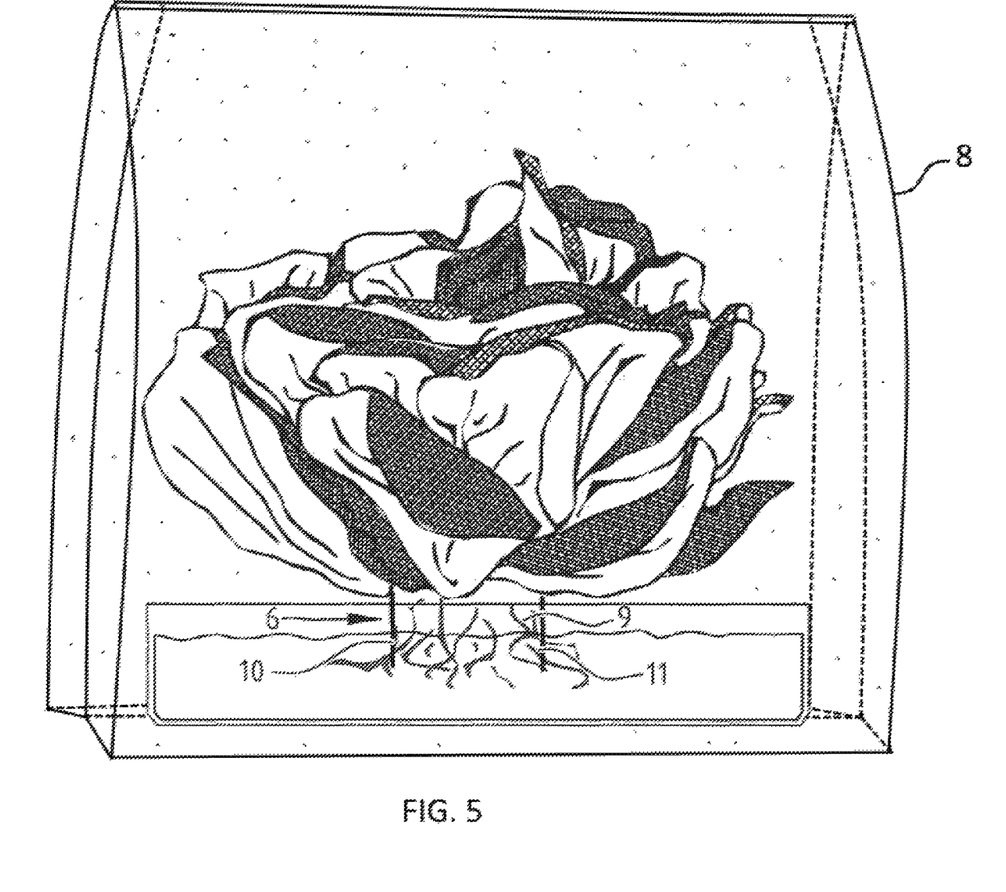
FIG. 5 shows a holder according to the present invention in a third embodiment, as a bag.

FIG. 4 shows an embodiment of the present invention with a crate or case-like holder 16. This comprises a reservoir 4 with upright side walls thereon. Reservoir 4 is per se box-like, wherein upright edges 18, which are as such an option, extend from the peripheral edges of box-like reservoir 4. The box-like reservoir 4 thus forms a kind of double bottom with an upper surface 17. Arranged on or at upper surface 17 are diverse passages 6, each with a screw thread 19 (or other coupling means). Containers 2 with a filter 8 thereon and a plant such as lettuce 3 therein can be arranged on or at passages 6. In this embodiment the container 2 for each of the lettuce plants 3 can be arranged on or at passages 6, for instance by means of a screw connection, in order to feed the lettuce 3 with water 5 from the interior of reservoir 4. The risks of transmission of pathogens thus remain limited to the number of containers 2 and lettuce plants 3 arranged on or at passages 6, here by means of screw thread 9 on each of the passages 6. Unused positions can be capped by means of a cover 20 or other closing element. Filter 8 can take the form of film, as already noted above. Perforations can be arranged in the film in order to realize the desired degree of closure and permeation. The perforation is functional, with as many perforations as possible of the smallest possible diameter and distributed as uniformly as possible over the surface of the film. The perforations are for instance smaller than 100 µm in order to keep out pathogens and the like and allow passage of vapour, gas or air. The perforations can be arranged in a quantity of (on average) 0.01 perforation per cm2 to 1000 perforations per cm2 depending on a desired permeation capacity, for instance in terms of quantities per unit of time. Vapour permeation out of the container, permeation of oxygen and carbon dioxide and the like from outside to the interior of the container as well as exclusion of pathogens in this way function as they should.

The film is preferably transparent. Perforations can be arranged therein with a hot-needle technique or with a laser, wherein it should be noted that smaller and more accurate openings or perforations can be obtained with a laser.

The present invention is described above on the basis of a limited number of embodiments thereof as shown in the accompanying drawing. Many other additional and alternative embodiments will occur to the skilled person, which must however all be deemed as lying within the scope of protection of the present invention as defined in the appended claims, particularly the independent claims, unless such further developments depart therefrom in letter or in spirit. The container and the filter can thus be manufactured from transparent materials so that the plant, particularly the lettuce, can be displayed visibly for sale. The film, which serves as the semi-permeable filter, can comprise micropores which allow permeation of vapour out of the holder in one direction but prevent penetration of air, vapour or even pathogens. The semi-permeable filter is preferably suitable however for allowing entry of oxygen and/or carbon dioxide and/or other gases. The choice for a specific film lies within the reach of the skilled person after examination of the foregoing. The container can be manufactured from glass or transparent plastic. Additionally or alternatively to the wick use can be made of rope, a string, a lamella or other element drawing or suctioning moisture from the reservoir. In embodiments with more than one passage for a single plant or with more than one plant with a passage for each plant, a wick can be arranged in or at each passage. The level of moisture in the reservoir, or more particularly the height of the reservoir itself, can be adjusted such that substrate or the roots of the plants can be moistened directly at an early stage of cultivation with moisture from the reservoir. When the moisture level in the reservoir falls, the roots will already have developed to some extent and extend downward to the water in the reservoir. With a correct dimensioning of the height and width of the reservoir the need for the element which draws or suctions up the moisture may thus be obviated. The container and the filter can be embodied together, for instance in the form of a bag, which can comprise (micro-) perforations in order to realize desired semi-permeable properties of the filter. A reservoir can then carry the plant directly thereon and be arranged with the plant in the bag. It is therefore also possible in such an embodiment to allow the plants to develop from the very beginning to full growth, or at least keep it in the container until the plant has developed sufficiently for commercial purposes.

The descriptions above are intended to be illustrative, not limiting. It will be apparent to the person skilled in the art that alternative and equivalent embodiments of the invention can be conceived and reduced to practice, without departing from the scope of the claims set out below.

What is claimed is:

1. A closed-off holder for producing a plant of any one of lettuce, sprout and herbs, comprising:
   an integrally formed container formed from a semi-permeable filter material forming a semi-permeable closed-off bag, for defining a closed space for wholly accommodating the plant;
   a reservoir for holding an amount of liquid in the closed space;
   a substrate holder forming a closable passage above said reservoir which is open during use for supplying the liquid from the reservoir to the plant; and
   a separator arranged between the reservoir and said substrate holder;
   wherein the reservoir, the container and the semi-permeable filter are arranged to form a closed-off holder and are designed to allow the whole plant to grow in the closed space,
   wherein the semi-permeable filter has a vapour permeation capacity in terms of a quantity per unit of time.

2. The holder according to claim 1, wherein the container and the reservoir form a unit.

3. The holder according to claim 1, wherein the separator is a liquid barrier preventing flow of liquid out of the liquid reservoir into the container.

4. The holder according to claim 1, wherein the substrate holder for accommodating roots of the plant is arranged between the container and the reservoir.

5. The holder according to claim 1, wherein at least one element is arranged in the substrate holder from the group comprising: a rope, a string, a wick, a lamella, which has a moisture-transmitting capacity, for instance on the basis of a capillary action, from the reservoir to the plant.

6. The holder according to claim 1, wherein the semi-permeable filter is closed to elements entering from outside.

7. The holder according to claim 1, wherein the reservoir positioned within said integrally formed container.

* * * * *